US011529691B2

(12) United States Patent
Brunetto et al.

(10) Patent No.: US 11,529,691 B2
(45) Date of Patent: Dec. 20, 2022

(54) ROTARY CUTTING TOOL WITH HYBRID CUTTING INSERT DESIGN

(71) Applicant: Kennametal Inc., Latrobe, PA (US)

(72) Inventors: Lance David Brunetto, Latrobe, PA (US); Ruy Frota de Souza Filho, Latrobe, PA (US); Ronald Louis Dudzinsky, Latrobe, PA (US)

(73) Assignee: KENNAMETAL INC., Latrobe, PA (US)

( * ) Notice: Subject to any disclaimer, the term of this patent is extended or adjusted under 35 U.S.C. 154(b) by 542 days.

(21) Appl. No.: 16/700,266

(22) Filed: Dec. 2, 2019

(65) Prior Publication Data
US 2021/0162516 A1 Jun. 3, 2021

(51) Int. Cl.
| | |
|---|---|
| B23C 5/02 | (2006.01) |
| B23C 5/20 | (2006.01) |
| B23C 5/22 | (2006.01) |
| B23C 1/02 | (2006.01) |
| B23C 5/10 | (2006.01) |

(52) U.S. Cl.
CPC ............... *B23C 1/02* (2013.01); *B23C 5/02* (2013.01); *B23C 5/109* (2013.01); *B23C 5/202* (2013.01); *B23C 2200/367* (2013.01); *B23C 2210/16* (2013.01)

(58) Field of Classification Search
CPC .... B23C 2200/0455; B23C 2200/0494; B23C 2200/367; B23C 1/02; B23C 2210/16; B23C 5/109; B23C 5/202; B23C 5/02; B23C 5/20
See application file for complete search history.

(56) References Cited

U.S. PATENT DOCUMENTS

| | | | | | |
|---|---|---|---|---|---|
| 3,701,187 | A | * | 10/1972 | Erkfritz | B23C 5/2226 407/115 |
| 3,811,163 | A | * | 5/1974 | Frederick | B23C 5/06 407/54 |
| 3,913,196 | A | * | 10/1975 | Maday | B23D 61/003 408/230 |
| 4,182,587 | A | * | 1/1980 | Striegl | B23C 5/109 407/113 |
| 4,681,485 | A | * | 7/1987 | Koelewijn | B23C 5/109 407/53 |

(Continued)

FOREIGN PATENT DOCUMENTS

| | | |
|---|---|---|
| DE | 200 23 770 U1 | 7/1999 |
| DE | 10 2014 108 513 A1 | 6/2014 |

(Continued)

*Primary Examiner* — Sara Addisu
(74) *Attorney, Agent, or Firm* — Larry R. Meenan (57) ABSTRACT

A rotary cutting tool includes a cutting head having a plurality of insert-receiving pockets for radially mounting a first type of cutting insert in a first cutting region and for tangentially mounting a second type of cutting insert in a second cutting region. The first cutting region has a first length, L1, and the second cutting region has a second length, L2, that is greater in magnitude than the first length, L1. The two types of cutting inserts provides a hybrid cutting insert design in which the first type of cutting inserts provide an increased chip gash volume for effective chip evacuation, and the second type of cutting inserts provide an increased core diameter to minimize deflection of the rotary cutting tool.

19 Claims, 9 Drawing Sheets

(56) References Cited

U.S. PATENT DOCUMENTS

| | | | | |
|---|---|---|---|---|
| 4,790,693 A * | 12/1988 | Koblesky | ................ | B23C 5/109 407/42 |
| 4,927,303 A * | 5/1990 | Tsujimura | ............ | B23C 5/1027 407/42 |
| 4,988,241 A * | 1/1991 | Colligan | ................... | B23C 5/04 407/62 |
| 4,993,891 A * | 2/1991 | Kaminiski | ............ | B23C 5/2269 407/42 |
| 5,027,914 A * | 7/1991 | Wilson | .................... | E21B 10/26 408/232 |
| 5,542,792 A * | 8/1996 | Krueger | ................. | B23C 5/109 407/41 |
| 5,586,843 A * | 12/1996 | Minicozzi | ............ | B23C 5/2213 407/42 |
| 5,676,505 A * | 10/1997 | Gauss | ....................... | B23C 5/08 407/51 |
| 5,816,753 A * | 10/1998 | Hall | ....................... | B23B 51/00 408/223 |
| 5,890,854 A * | 4/1999 | Naumann | ................. | B23B 5/28 409/199 |
| 5,944,456 A * | 8/1999 | Shirley | .................. | B23C 5/202 407/53 |
| 5,984,592 A * | 11/1999 | Harper | ................. | B23C 5/2213 407/34 |
| 6,109,838 A * | 8/2000 | Riviere | ................. | B23C 5/2213 407/113 |
| 6,200,078 B1 * | 3/2001 | Kubota | ................... | B23B 51/00 407/53 |
| 6,234,725 B1 * | 5/2001 | Campian | ............. | B23C 5/1009 408/67 |
| 6,270,292 B1 * | 8/2001 | Satran | ................... | B23C 5/2204 407/42 |
| 6,322,296 B1 * | 11/2001 | Wetli | ...................... | B23C 5/109 407/53 |
| 6,511,265 B1 * | 1/2003 | Mirchandani | ........... | B23P 15/28 407/53 |
| 7,862,263 B2 * | 1/2011 | van Iperen | ................ | B23C 5/10 407/54 |
| 7,980,794 B2 * | 7/2011 | Kawade | ................ | B23B 51/108 408/233 |
| 8,226,334 B2 * | 7/2012 | Hanks | ....................... | B23C 5/10 407/59 |
| 8,622,661 B2 * | 1/2014 | Inamasu | ............ | B23Q 11/0046 409/137 |
| 10,272,504 B2 * | 4/2019 | Dodds | ...................... | B23P 15/34 |
| 2003/0031520 A1 * | 2/2003 | Hintze | .................. | B23B 27/141 407/116 |
| 2003/0143045 A1 * | 7/2003 | Gessell | ..................... | B23C 3/06 409/64 |
| 2004/0018064 A1 * | 1/2004 | Liu | .......................... | B23B 27/00 408/224 |
| 2008/0170921 A1 * | 7/2008 | Sjoo | ....................... | B23G 5/184 408/232 |
| 2008/0193234 A1 * | 8/2008 | Davancens | ............... | B23C 5/28 408/144 |
| 2009/0052997 A1 * | 2/2009 | Shimizu | ................. | B23C 5/202 407/34 |
| 2012/0093594 A1 * | 4/2012 | Kirchberger | ............ | B23C 5/109 407/42 |
| 2012/0230784 A1 | 9/2012 | Hoefler et al. | | |
| 2018/0050397 A1 | 2/2018 | Fraese et al. | | |
| 2021/0001416 A1 * | 1/2021 | Chan | ....................... | B23C 5/109 |

FOREIGN PATENT DOCUMENTS

| | | | | |
|---|---|---|---|---|
| DE | 20 2017 103 022 A1 | | 5/2017 | |
| JP | 09201714 A | * | 8/1997 | ............ B23C 5/109 |
| JP | 2001219313 A | * | 8/2001 | |
| WO | 2017/198265 A1 | | 5/2016 | |

* cited by examiner

ROTARY CUTTING TOOL WITH HYBRID CUTTING INSERT DESIGN

BACKGROUND OF THE INVENTION

Field of the Invention

The invention relates to rotary cutting tools with cutting inserts mounted thereon, and in particular to a helical milling cutter with a hybrid design having at least one leading row of a first type of radially mounted cutting inserts and at least one trailing row of a second type of tangentially mounted cutting inserts.

Description of Related Art

Milling cutters with long lengths experience large deflection when cutting loads are applied. This causes excess stresses at the base of the cutter that have been seen to exceed the yield strength of the cutter body material, causing failure.

Tangentially mounted inserts improve this situation because they are thinner in the radial direction and allow for a bigger core diameter on the cutter body. However, the thinner inserts are not as efficient at removing swarf (i.e., chips) from the cut as radially mounted inserts because the chip gash (i.e., flute) is also thinner. To be an effective long-length helical milling cutter, the rotary cutting tool must both have stiffness and ample room for effective chip evacuation.

SUMMARY OF THE INVENTION

The problem of providing a milling cutter having both stiffness and ample room for chip evacuation is solved by providing a rotary cutting tool, such as a milling cutter, with radially mounted cutting inserts in the leading rows of the milling cutter and tangentially mounted cutting inserts in the trailing rows of the milling cutter.

By using two types of inserts having different thickness, the hybrid design of the invention provides adequate chip gash (i.e., flute) volume for effective chip evacuation where it is most critical toward the front of the milling cutter, and a larger cross-sectional core diameter where bending is the highest toward the base of the milling cutter. A finite element analysis (FEA) showed about a 30% decrease in deflection, as compared to a milling cutter with only radial mounted cutting inserts.

In one aspect of the invention, a rotary cutting tool comprises a cutting head having a plurality of insert-receiving pockets in a first cutting region proximate an end face of the rotary cutting tool and a second cutting region proximate a shank of the rotary cutting tool. A plurality of a first type of cutting inserts are mounted in the insert-receiving pockets of the first cutting region of the cutting head. Each first type of cutting insert has a first thickness. A plurality of a second type of cutting inserts are mounted in the insert-receiving pockets of the second cutting region of the cutting head. The plurality of the first type of cutting inserts provide an increased chip gash volume for effective chip evacuation, and the plurality of the second type of cutting inserts provide an increased core diameter to minimize deflection of the rotary cutting tool.

In another aspect of the invention, a rotary cutting tool comprises a cutting head having a plurality of insert-receiving pockets in a first cutting region proximate an end face of the rotary cutting tool and a second cutting region proximate a shank of the rotary cutting tool. The first cutting region has a first length, L1, and the second cutting region has a second length, L2. A plurality of a first type of cutting inserts are radially mounted in the insert-receiving pockets of the first cutting region of the cutting head. A plurality of a second type of cutting inserts are tangentially mounted in the insert-receiving pockets of the second cutting region of the cutting head. The first length, L1 of the first cutting region is greater than 50% of a total length (L1+L2) of the first cutting region and the second cutting region.

BRIEF DESCRIPTION OF THE DRAWINGS

While various embodiments of the invention are illustrated, the particular embodiments shown should not be construed to limit the claims. It is anticipated that various changes and modifications may be made without departing from the scope of this invention.

DETAILED DESCRIPTION OF THE INVENTION

Figure 1:
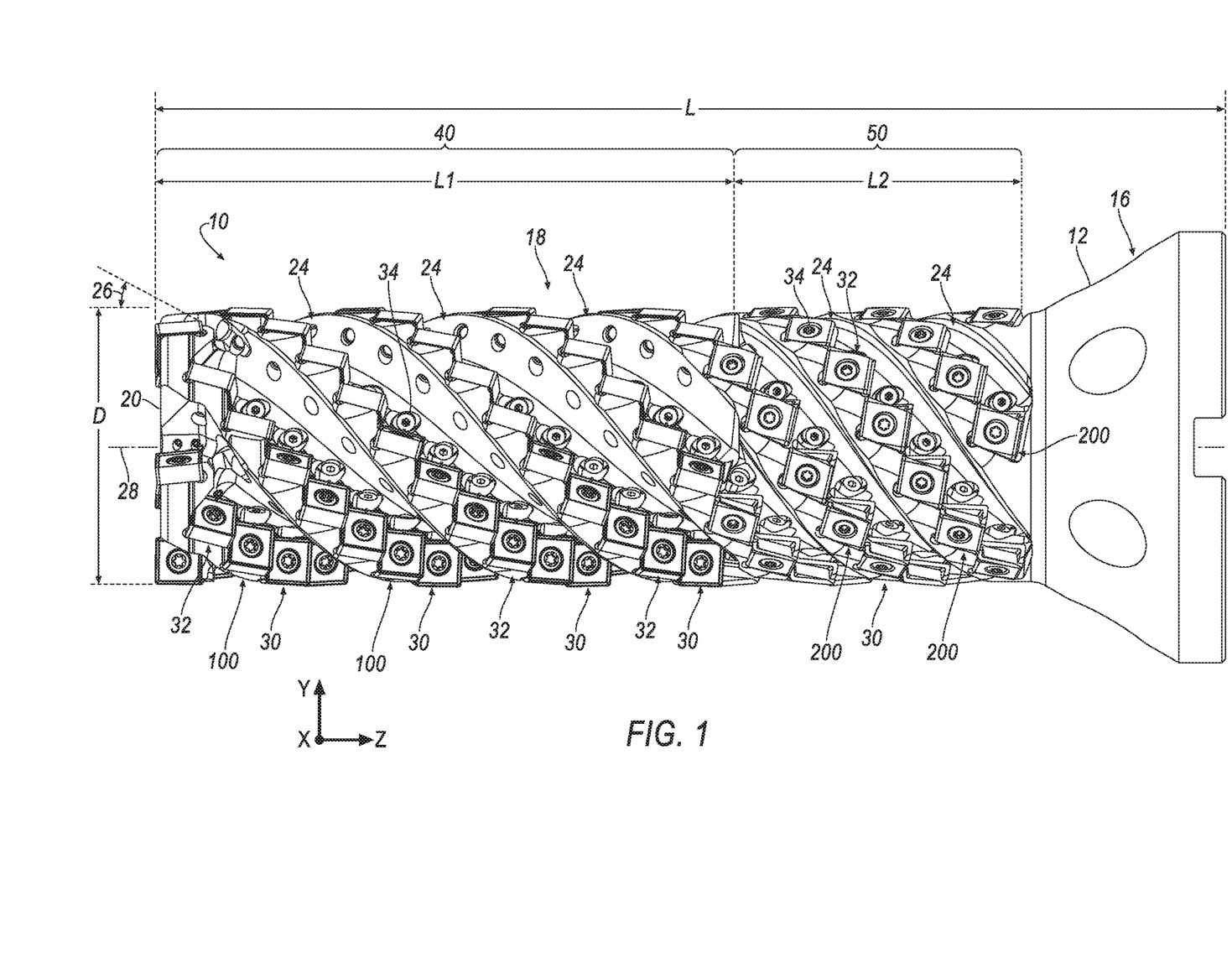
FIG. 1 is a side view of a rotary cutting tool with a plurality of cutting inserts mounted thereon according to an embodiment of the invention.
Figure 2:
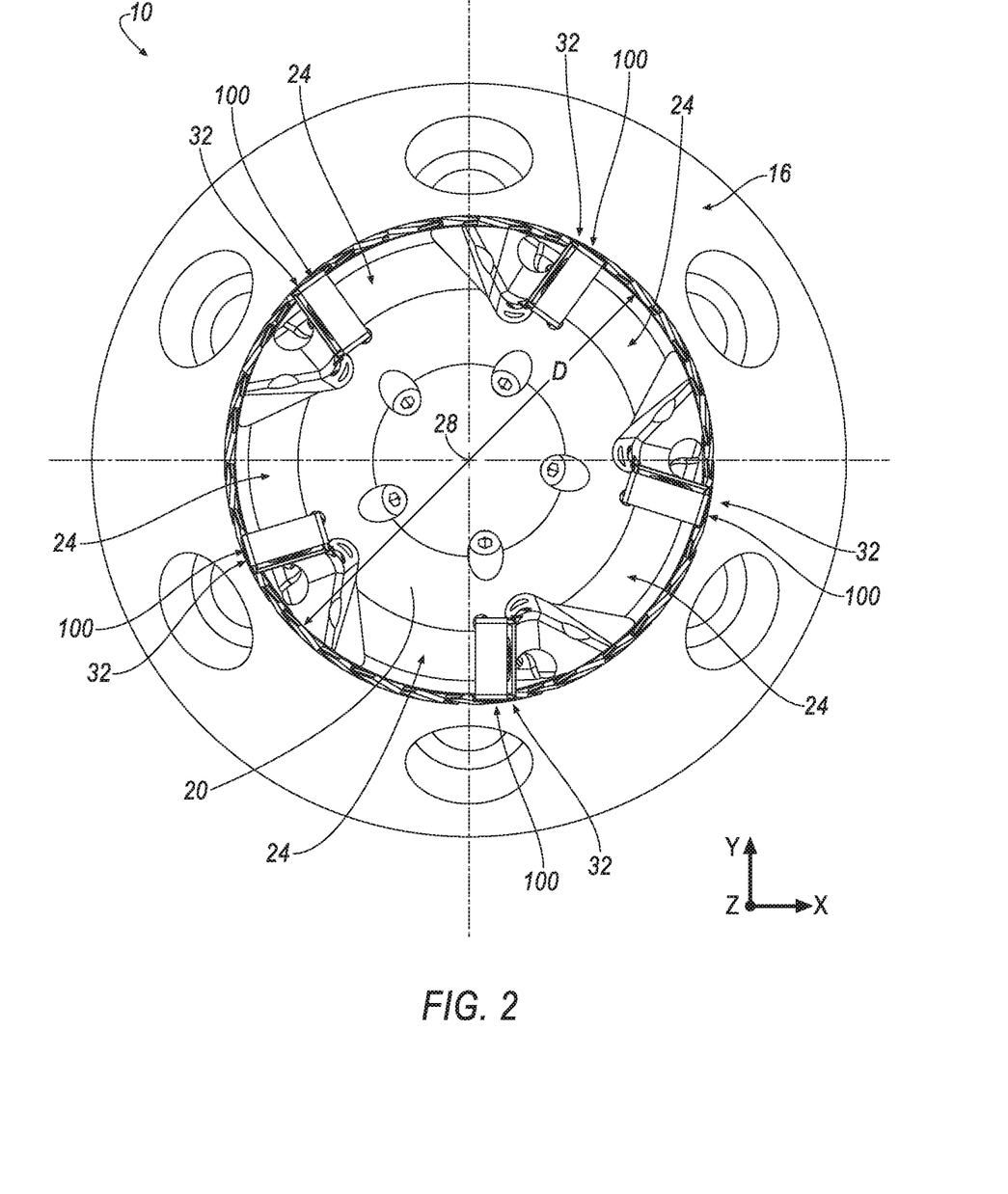
FIG. 2 is an end view of the rotary cutting tool of FIG. 1.

Referring now to FIGS. 1 and 2, a rotary cutting tool is shown generally at 10 according to an embodiment of the invention. In general, the rotary cutting tool 10 comprises a helical milling cutter including a cutter body 12 having an elongated and generally cylindrical shape. The cutter body 12 comprises a shank 16 and a cutting head 18. The shank 16 is configured so as to be capable of insertion and securing within the spindle of a milling machine (not shown) as is well known in the art. In the illustrated embodiment, the shank 16 has a tapered design so as to be capable of this insertion and securing within the spindle. However, it should be appreciated that the shank 16 may be of any shape or design so as to be capable of inserting and securing within the spindle. Such designs include, but are not limited to, V-flange, shell mill mount, Weldon shank, and the like. In the illustrated embodiment, the rotary cutting tool has a large length to diameter ratio (i.e., L/D ratio) above about 2:1.

Although a milling cutter is described in the illustrated embodiment, the principles of the invention can be applied to other types of rotary cutting tools, such as end mills, twist drills, and the like.

Directional phrases used herein, such as, for example, left, right, front, back, top, bottom and derivatives thereof, relate to the orientation of the elements shown in the drawings and are not limiting upon the claims unless expressly recited therein. Identical parts are provided with the same reference number in all drawings.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

Throughout the text and the claims, use of the word "about" in relation to a range of values (e.g., "about 2 to 5 inches") is intended to modify both the high and low values recited, and reflects the penumbra of variation associated with measurement, significant figures, and interchangeability, all as understood by a person having ordinary skill in the art to which this invention pertains.

For purposes of this specification (other than in the operating examples), unless otherwise indicated, all numbers expressing quantities and ranges of ingredients, process conditions, etc., are to be understood as modified in all instances by the term "about". Accordingly, unless indicated to the contrary, the numerical parameters set forth in this specification and attached claims are approximations that can vary depending upon the desired results sought to be obtained by the present invention. At the very least, and not as an attempt to limit the application of the doctrine of equivalents to the scope of the claims, each numerical parameter should at least be construed in light of the number of reported significant digits and by applying ordinary rounding techniques. Further, as used in this specification and the appended claims, the singular forms "a", "an" and "the" are intended to include plural referents, unless expressly and unequivocally limited to one referent.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements including that found in the measuring instrument. Also, it should be understood that any numerical range recited herein is intended to include all sub-ranges subsumed therein. For example, a range of "1 to 10" is intended to include all sub-ranges between and including the recited minimum value of 1 and the recited maximum value of 10, i.e., a range having a minimum value equal to or greater than 1 and a maximum value of equal to or less than 10. Because the disclosed numerical ranges are continuous, they include every value between the minimum and maximum values. Unless expressly indicated otherwise, the various numerical ranges specified in this application are approximations.

In the following specification and the claims, a number of terms are referenced that have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

As used herein, the term "elongate" is defined as something that is longer than it is wide. In other words, the width is smaller than its length.

As used herein, a rotary cutting tool having a "large L/D ratio" is defined as a rotary cutting tool having a length to diameter ratio (i.e., L/D ratio) above about 2:1.

As used herein, the term "region" is defined as any of the major subdivisions into which something or one of its parts is divisible. For example, the cutting head is divided into two regions: a first cutting region and a second cutting region. In another example, a simple closed curve divides a plane into two regions.

The cutting head 18 is generally a cylindrical or substantially cylindrical body or shaft extending axially from the shank 16 to an end face 20. The head 18 includes a plurality of helical chip grooves or flutes 24. It will be appreciated that the invention is not limited by the number of flutes 24. For example, in the illustrated embodiment, the cutter tool 10 includes a total of five flutes 24, although any number of flutes are contemplated by the invention. Each flute 24 is cut into the cutting head 18 in a helical or spiral manner that extends from the end face 20 to substantially the shank 16. In one embodiment, each flute 24 is cut at a helix angle 26 of about between about 10 degrees and about 40 degrees with respect to a central, longitudinal axis 28 of the milling cutter body 12.

The rotary cutting tool 10 has a length, L, of between about 6.85 inches (174 mm) and about 8.03 inches (204 mm) and has a cutting diameter, D, of between about 2.48 inches (63 mm) and about 3.10 inches (80 mm). For example, in one embodiment, the rotary cutting tool 10 has a length, L, of about 11.5 inches (292.1 mm) and has a cutting diameter, D, of about 3.0 inches (76.2 mm). As shown in FIG. 1, the cutter body 12 rotates about the central, longitudinal axis 28 in the direction of the arrow.

Each flute 24 is disposed between and associated with a helical grouping or row 30 of cutting inserts 100, 200. The cutter body 12 includes a plurality of insert-receiving pockets 32 for mounting a respective cutting insert therein. When the cutting tool 10 is assembled, each of the cutting inserts 100, 200 is retained in its respective insert-receiving pocket 32 by an insert screw 34.

In the illustrated embodiment, there is a one-to-one correspondence between the number of helical groupings or rows 30 and the number of flutes 24. As mentioned above, the rotary cutting tool 10 in the illustrated embodiment includes a total of five flutes 24. Thus, the rotary cutting tool 10 includes a total of five helical groupings or rows 30 of cutting inserts 100, 200. However, it will be appreciated that the invention is not limited by the number of flutes and corresponding number of helical rows, and that the invention can be practiced with any desirable number of flutes and helical rows, depending on the dimensions of the cutter body 12.

As mentioned above, milling cutters with long lengths (i.e., greater than 5.9 inches (150 mm)) or large L/D ratios (i.e., having a L/D ratio greater than 2:1) experience large deflection when cutting loads are applied. This causes excess stresses at the base of the cutter that have been seen to exceed the yield strength of the cutter body material, causing failure.

In accordance with one aspect of the invention, the cutting head 18 includes a plurality of a first type of cutting inserts, shown generally at 100, radially mounted in a first cutting region 40 of the cutting head 18, and a plurality of a second type of cutting inserts, shown generally at 200, tangentially mounted in a second cutting region 50 of the cutting head 18. By using two types of cutting inserts 100, 200 having different thickness, the hybrid design of the invention provides adequate chip gash (i.e., flute) volume for effective chip evacuation where it is most critical toward the front of the milling cutter (i.e., proximate the end face 20), and a larger cross-sectional core diameter where bending is the highest toward the base of the milling cutter (i.e., proximate the shank 16).

As shown in FIG. 1, the first type of cutting inserts 100 are mounted on the cutting head 12 in the first cutting region 40 having a first length, L1, of the cutting head 18, and the second type of cutting inserts 200 are mounted on the cutting head 12 in a second cutting region 50 having a second length, L2. The first cutting region 40 extends from the end face 20, and the second cutting region 50 extends from the first cutting region 40 to the shank 16. In one aspect, the first length, L1, of the first cutting region 40 is greater in magnitude than the second length, L2, of the second cutting region 50. In other words, the first length, L1, is greater than 50% of the total length (L1+L2) of the first length, L1, and the second length, L2. For example, the first cutting region 40 can have a first length, L1, of about 6.05 inches (153.66 mm), and the second cutting region 50 can have a second length, L2, of about 3.226 inches (81.95 mm). In this example, the total length (L1+L2) of the first and second cutting regions 40, 50 is about 9.28 inches (235.6 mm). Thus, the first length, L1, of the first cutting region 40 is about 65.22% of the total length (L1+L2) of the first and second cutting regions 40, 50, and the second length, L2, of the second cutting region 50 is about 34.78% of the total length (L1+L2) of the first and second cutting regions 40, 50.

It should be noted that the invention is not limited by the relative lengths, L1 and L2, of the first and second cutting regions 40, 50, and that the invention can be practiced with any desirable lengths, L1 and L2, for the first and second cutting regions 40, 50, so long as the first length, L1, of the first cutting region 40 is greater in magnitude than the second length, L2, of the second cutting region 50 (i.e., greater than 50% of the total length, L1+L2).

Referring now to FIGS. 3-7, the first type of cutting insert 100 is a generally square-shaped, indexable cutting insert having a first or top surface 112, a second or bottom surface 114, a plurality of flank surfaces 116. A cutting edge 120 is formed at an intersection between the top surface 112 and each of the flank surfaces 116, and also between the bottom surface 114 and each of the flank surfaces 116. Thus, the cutting insert 100 has a total of eight cutting edges 120. It should be appreciated that because the terms "top" and "bottom" are directional phrases, the "top" surface 112 of the cutting insert 100 can become the "bottom" surface 114 when mounted upside down in the insert pocket 32, and vice versa.

Figure 3:
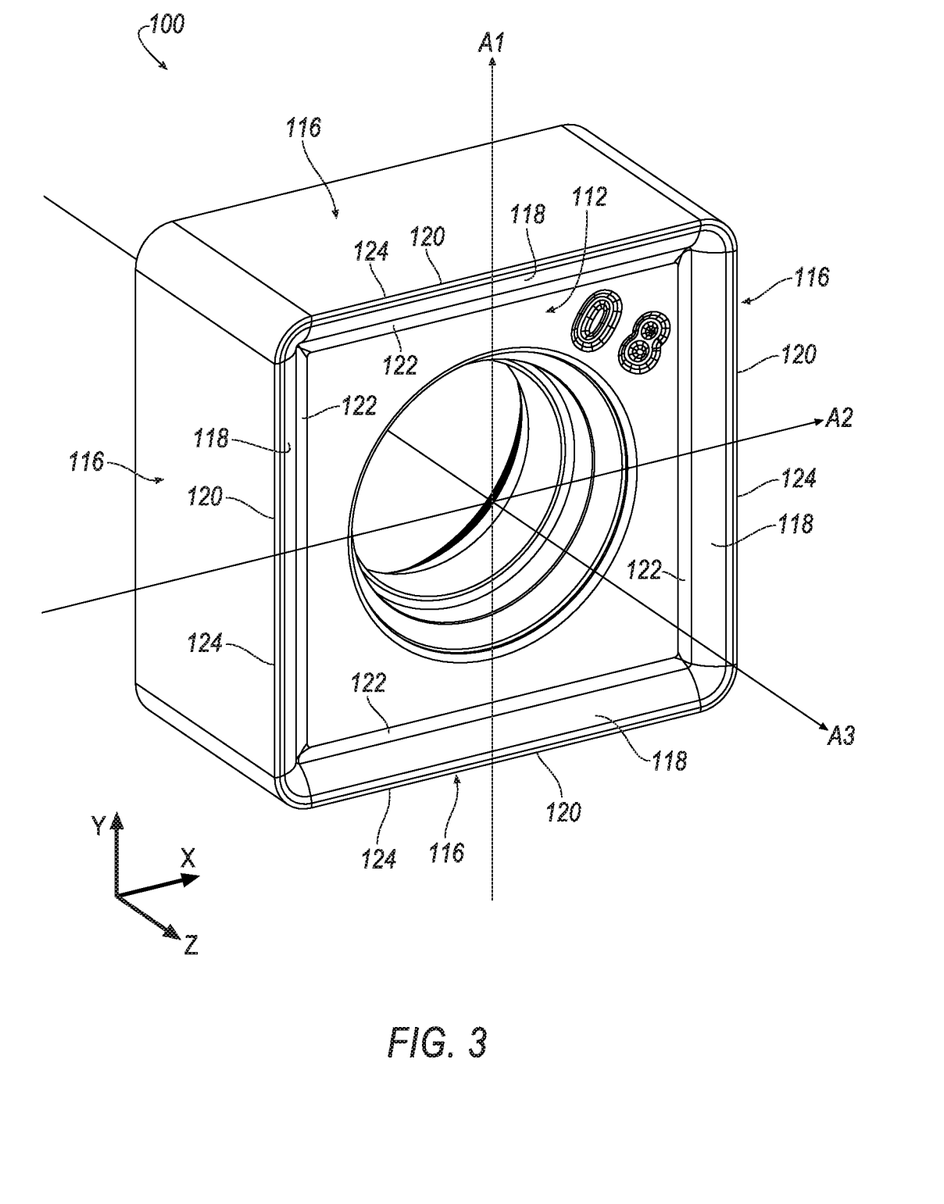
FIG. 3 is a perspective view of a first type of cutting insert according to an aspect of the invention.

In the illustrated embodiment, the top surface 112 of the cutting insert 100 is substantially identical to the bottom surface 114. Thus, only the top surface 112 will be described herein for brevity. However, it will be appreciated that the description of the top surface 112 also applies to the bottom surface 114.

As shown in FIG. 3, two opposing flank surfaces 116 has 180° rotational symmetry about a first central axis, A1, passing through the two opposing flank surfaces 116, and the other two opposing flank surface 116 has 180° rotational symmetry about a second central axis, A2, passing through the two flank surfaces 116, and the top and bottom surfaces 112, 114 has 180° rotational symmetry about a third central axis, A3, passing through the top and bottom surfaces 112, 114. The second central axis, A2, is perpendicular to the first central axis, A1, and the third central axis, A3, is perpendicular to the first central axis, A1, and to the second central axis, A2. It should be noted that the first central axis, A1, is substantially parallel to the Y-axis of the cutting insert 100, the second central, axis, A2, is substantially parallel to the X-axis of the cutting insert 100, and the third central axis, A3, is substantially parallel to the Z-axis of the cutting insert 100.

Figure 4:
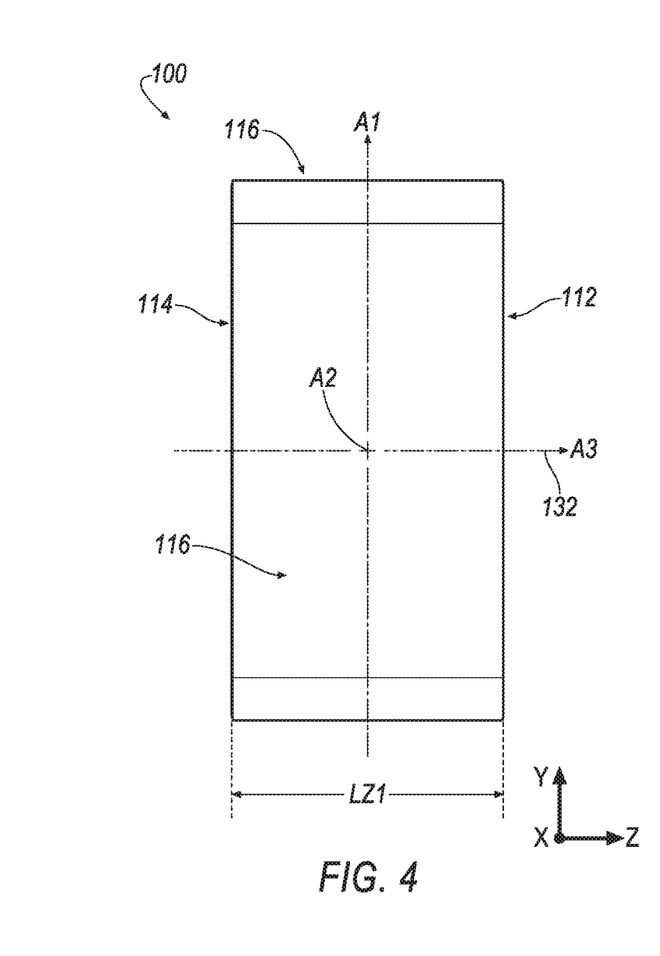
FIG. 4 is a side view of the exemplary embodiment of the first type of cutting insert of FIG. 3.
Figure 5:
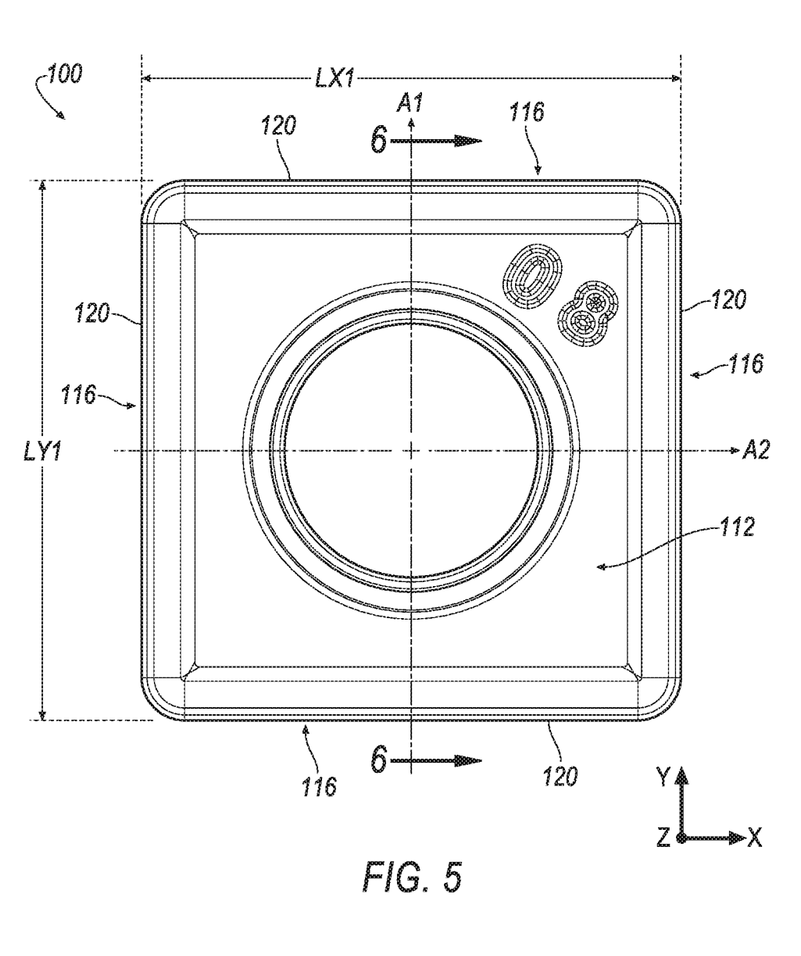
FIG. 5 is a top view of the exemplary embodiment of the first type of cutting insert of FIG. 3.

As shown in FIGS. 4 and 5, the cutting insert 100 has a length, LX1, along the X-axis, a length, LY1, along the Y-axis, and a length, LZ1, along the Z-axis. The lengths, LX1, LY1 and LZ1, are also known as the height, width, and thickness, respectively, of the cutting insert 100. Because the cutting insert 100 is substantially square-shaped, the length, LY1, along the Y-axis is equal to the length, LX1, along the X-axis. It should be noted that the lengths, LX1 and LY1, are greater in magnitude that the length, LZ1. For example, in one embodiment, the lengths, LX1 and LY1, are about 0.394 inches (10.00 mm), and the length, LZ1, is about 0.178 inches (4.52 mm).

The cutting insert 100 can be made of any suitable material. For example, the cutting insert 100 can be made of a material selected from the group of alumina-based ceramics, silicon nitride-based ceramics and SiALON based ceramics. Preferably, the ceramic composition has dispersed therein a reinforcing agent selected from the group of ceramic whiskers (e.g. titanium carbide and/or silicon carbide), ceramic particulate (e.g. zirconia, Hafnia, silicon carbide and/or titanium carbide) and their mixtures. In addition, the ceramic composition also preferably has a residue of a sintering aid dispersed therein. The sintering aid is preferably selected from the group of zirconia, alumina, aluminum nitride, yttria, yitterbia, lanthana, magnesia and their mixtures with each other or with other elements. A preferred ceramic composition comprises about 90-100% silicon nitride or sialon phases, rare earth oxide addition added in an amount of zero to 15 weight percent, all distributed in an silicon nitride or sialon matrix. More preferably, this composition has 4 to 12 weight percent of aluminum nitride, 5-12% Ytterbia 2-10 wt %.

Referring back to FIG. 3, the top surface 112 of the cutting insert 100 includes a chip forming feature, shown generally at 118, that extends in a generally radially inwardly direction from each cutting edge 120 to an inner edge 122. The chip forming feature 118 may include an optional land surface 124 adjacent the cutting edge 108 having a width 126 of between about 0.0 to about 0.2 inches (0.508 mm).

Figure 7:
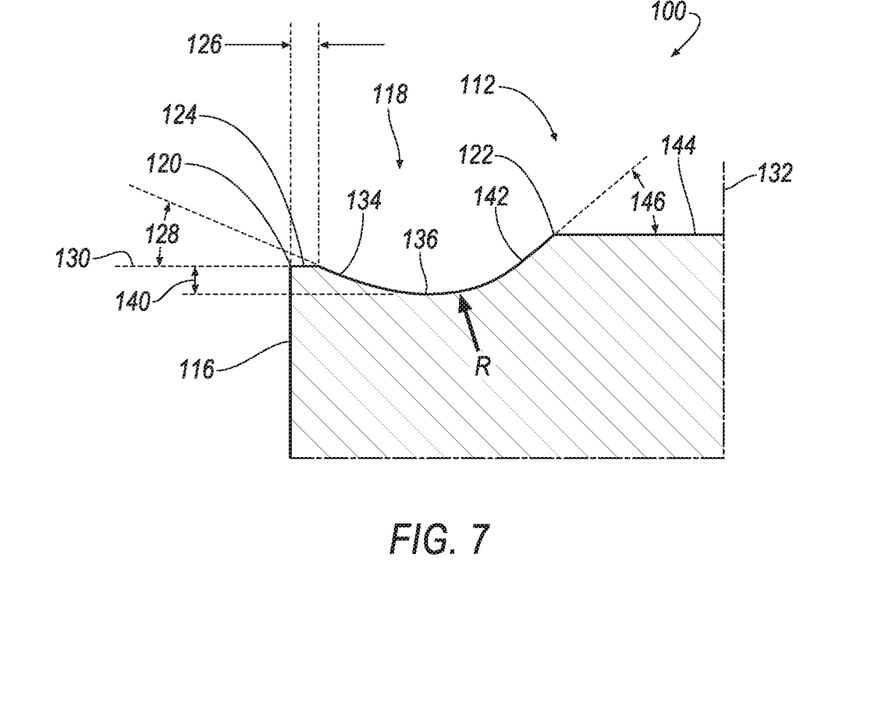
FIG. 7 is an enlarged view of the chip forming feature of the first type of cutting insert with an optional land surface formed at a zero angle with respect to a central, longitudinal axis of the cutting insert.
Figure 8:
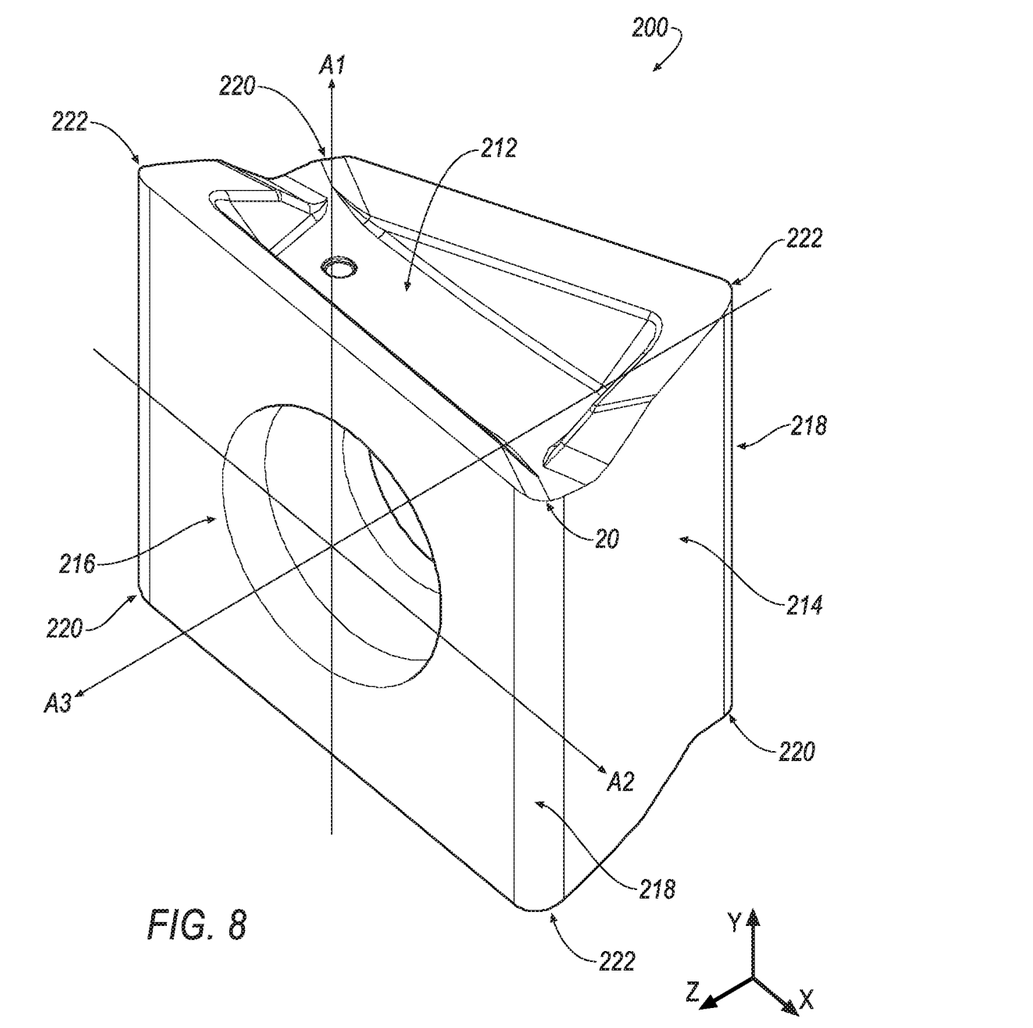
FIG. 8 is a perspective view of a second type of cutting insert according to an aspect of the invention.

Referring now to FIG. 7, the land surface 124 can be formed at an angle 128 of between about 0.0 degrees to about −25.0 degrees with respect to a plane 130 that is substantially perpendicular to a central, longitudinal axis 132 of the cutting insert 100.

As seen in FIG. 7, the chip forming feature 118 further includes a front wall 134 that slopes downward from the optional land surface 124 (or from the cutting edge 120 in the case in which the land surface 124 is omitted) radially inward toward a rounded bottom surface 136. The front wall 134 slopes downward at a rake angle 128 of between about 10 degrees and about 25 degrees with respect to the plane 130 that is substantially perpendicular to the central, longitudinal axis 132 of the cutting insert 100. The rounded bottom surface 136 is formed with a radius, R, of between about 0.02 inches (0.508 mm) to about 0.08 inches (2.032 mm). The rounded bottom surface 136 has a depth 140 of between about 0.006 inches (0.1524 mm) to about 0.025 inches (0.635 mm) with respect to the cutting edge 120 of the cutting insert 100.

It is noted that the inner edge 122 is at the intersection of the back wall 142 and a central, substantially planar plateau 144. The back wall 142 slopes upward at an angle 146 of between about 30 degrees and about 50 degrees with respect to the plane 130 that is substantially perpendicular to the central, longitudinal axis 132 of the cutting insert 100. The central plateau 144 acts as a seating surface for the cutting insert 100 when mounting the cutting insert 100 in the milling cutter 10.

A substantially square-shaped first type of cutting insert 100 is shown and described above. However, it will be appreciated that the invention is not limited by the shape of the cutting insert 100, and that the principles of the invention can be practiced with cutting inserts having any desirable shape. For example, the principles of the invention can be practiced a round cutting insert. Other shapes, such as triangular, trigon, rectangular, and any polygonal-shaped cutting insert are contemplated are within the scope of the invention.

Referring now to FIGS. 8-14, the second type of cutting insert 200 is shown according to an embodiment of the invention. In general, the cutting insert 200 is rectangular in shape and has two identical opposing end seating surfaces 212, two identical opposing minor side surfaces 214 extending between the two opposing end seating surfaces 212, two identical opposing major side surfaces 216 extending between the end surfaces 212 and the minor side surfaces 214. Each end surface 212 has 180° rotational symmetry about a first central axis, A1, passing through the two end surfaces 212, each minor side surface 214 has 180° rotational symmetry about a second central axis, A2, passing through the two minor side surfaces 214, and each major side surface 216 has 180° rotational symmetry about a third central axis, A3, passing through the two major side surfaces 216. The second central axis, A2, is perpendicular to the first central axis, A1, and the third central axis, A3, is perpendicular to the first central axis, A1, and to the second central axis, A2. The cutting insert 200 also includes four opposed corner side surfaces 218 extending between the minor and major side surfaces 214, 216 and the end surfaces 212.

Figure 9:
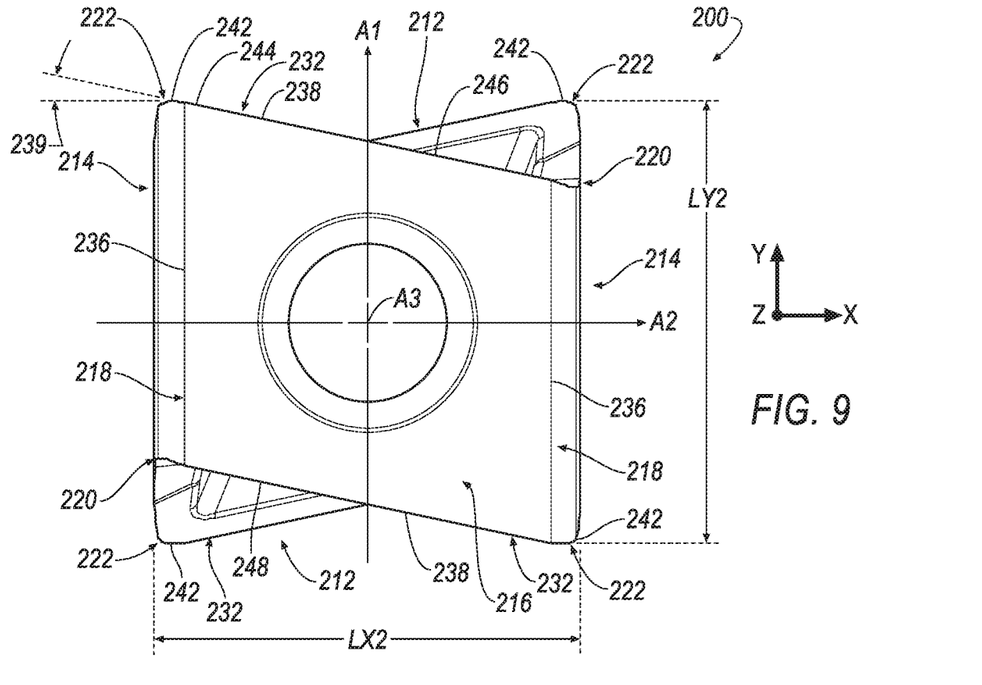
FIG. 9 is a front view of the exemplary embodiment of the second type of cutting insert of FIG. 8.
Figure 12:
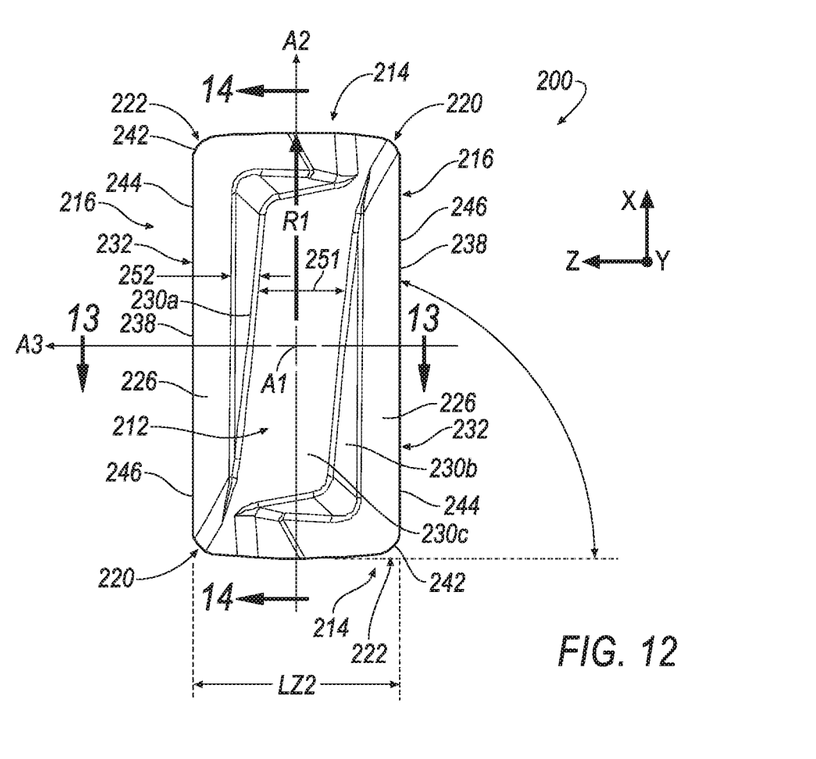
FIG. 12 is a top view of the exemplary embodiment of the second type of cutting insert of FIG. 8.

As shown in FIGS. 9 and 12, the cutting insert 200 has a length, LX2, along the X-axis, a length, LY2, along the Y-axis, and a length, LZ2, along the Z-axis. The lengths, LX2, LY2 and LZ2, are also known as the height, width, and thickness, respectively, of the cutting insert 200. It should be noted that the lengths, LX2 and LY2, are greater in magnitude than the length, LZ2, and the length, LY2, is greater in magnitude than the length, LX2. For example, in one embodiment, the length, LX2, is about 0.512 inches (13.00 mm), the length, LY2, is about 0.532 inches (13.50 mm), and the length, LZ2, is about 0.250 inches (6.35 mm).

It should also be noted that the length, LZ2, of the second type of cutting insert 200 is less in magnitude than the length, LX1, of the first type of cutting insert 100. In the illustrated embodiment, for example, the second type of cutting insert 200 has a length, LZ2, of about 0.250 inches (6.35 mm), and the first type of cutting insert 100 has a length, LX1, of about 0.394 inches (10.00 mm). The difference in the lengths, LZ2 and LX1, enables the tangentially-mounted second type of cutting insert 200 to provide an increased core diameter in the second cutting region 50 proximate the shank 16, as compared to the radially-mounted first type of cutting insert 100 in the first cutting region 40 proximate the end face 20 (i.e., distal the shank 16).

Each end surface 212 has four corners; two diagonally opposite lowered corners 220 and two diagonally opposite raised corners 222. The lowered corners 220 are closer to the second central axis, A2, than the raised corners 222. Each corner side surface 218 extends between the raised corner 222 of one of the two opposing end surfaces 212 and the lowered corner 220 of the other one of the two opposing end surfaces 212.

Two opposing major edges 232 are formed at the intersection of each end surface 212 and the major side surfaces 216, two opposing minor edges 234 are formed at the intersection of each end surface 212 and the minor side surfaces 214, and two opposing corner edges 236 are formed at the intersection of each the corner side surfaces 218 and the major side surfaces 216. A major cutting edge 238 is formed at the intersection of each major edge 232 and the end surface 212 and extends along substantially the entire length of its associated major edge 232. A minor cutting edge 240 is formed at the intersection of each minor edge 234 and the end surface 214 and extends along its associated minor edge 234. A corner cutting edge 242 is formed at the intersection of the major and minor cutting edges 238, 240. Because the cutting insert 200 is symmetric about all three axes, A1, A2 and A3, the cutting insert 200 has a total of four major cutting edges 238, four minor cutting edges 240 and four corner cutting edges 242.

Figure 10:
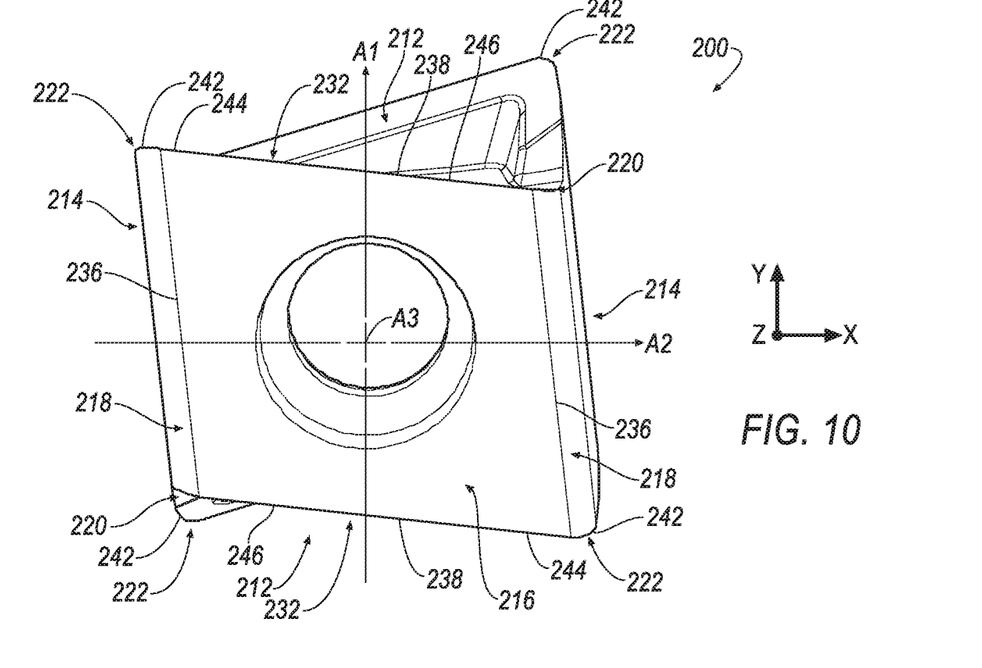
FIG. 10 is an isometric front view of the exemplary embodiment of the second type of cutting insert of FIG. 8.
Figure 11:
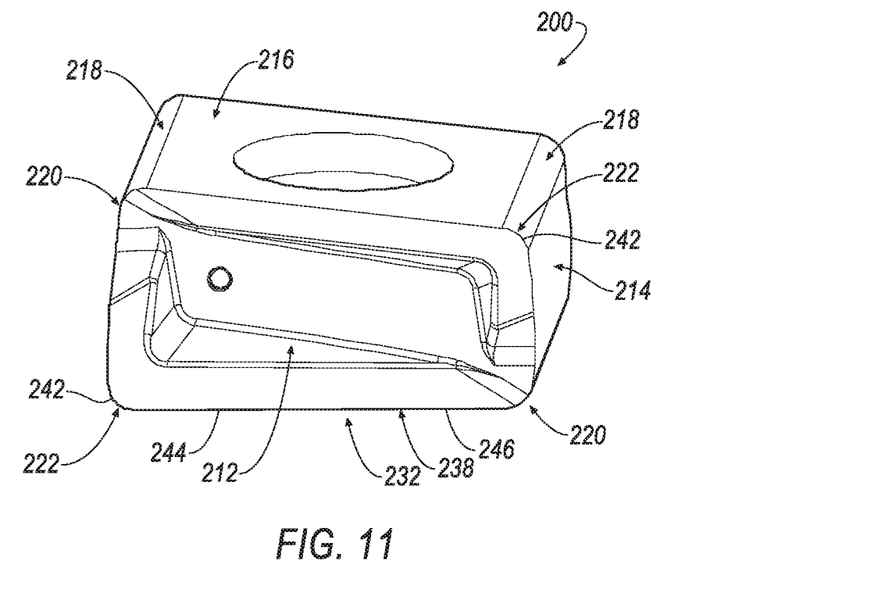
FIG. 11 is an isometric end view of the exemplary embodiment of the second type of cutting insert of FIG. 8.

The section of the major cutting edge 238 proximate the raised corner 222 constitutes a leading end 244 of the major cutting edge 238, whereas the section of the major cutting edge 238 proximate the lowered corner 220 constitutes a trailing end 246 of the major cutting edge 238, as shown in FIGS. 9 and 10. The major cutting edge 238 is formed at an angle 239 with respect to the second axis, A2. The angle 239 may be in the range between about 5 degrees and about 10 degrees. For example, the angle 239 may be about 12 degrees.

Referring now to FIG. 12, each minor side surface 214 is formed with a large radius, R1. As a result, each minor side surface 214 has a convex topography. In one embodiment, the radius, R1, is in the range between about 0.75 inches (19.05 mm) to about 1.25 inches (31.75 mm). For example, in the illustrated embodiment, the radius, R1, is about 0.984 inches (25.00 mm). However, it will be appreciated that the invention is not limited by the magnitude of the radius, R1, and that the invention can be practiced with any desirable magnitude of the radius, R1, so long as the minor side surface 214 has a convex topography.

Figure 13:
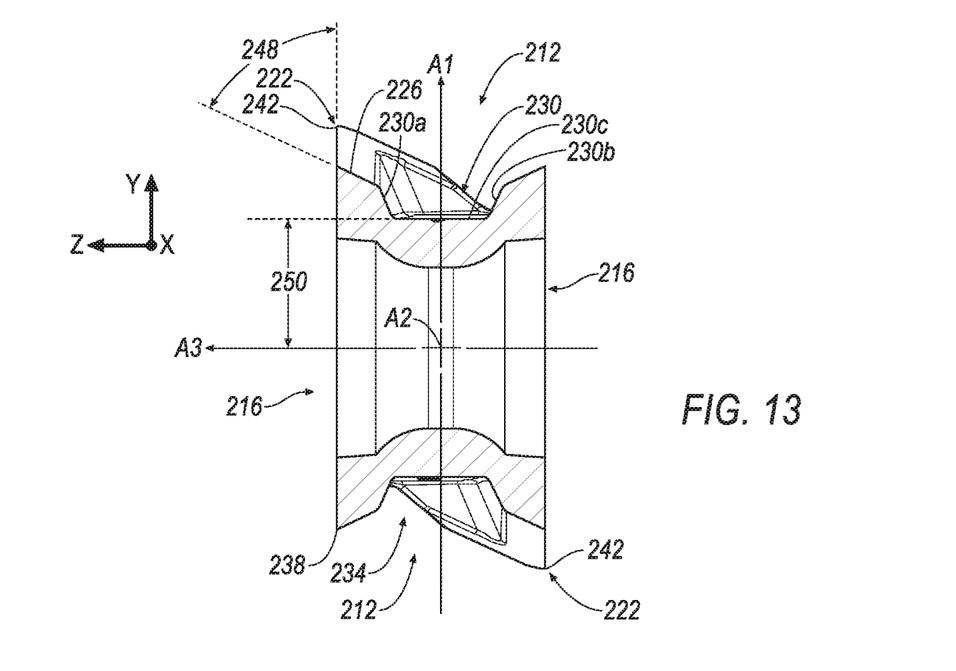
FIG. 13 is a cross-sectional view of the exemplary embodiment of the second type of cutting insert taken along line 13-13 of FIG. 12.
Figure 14:
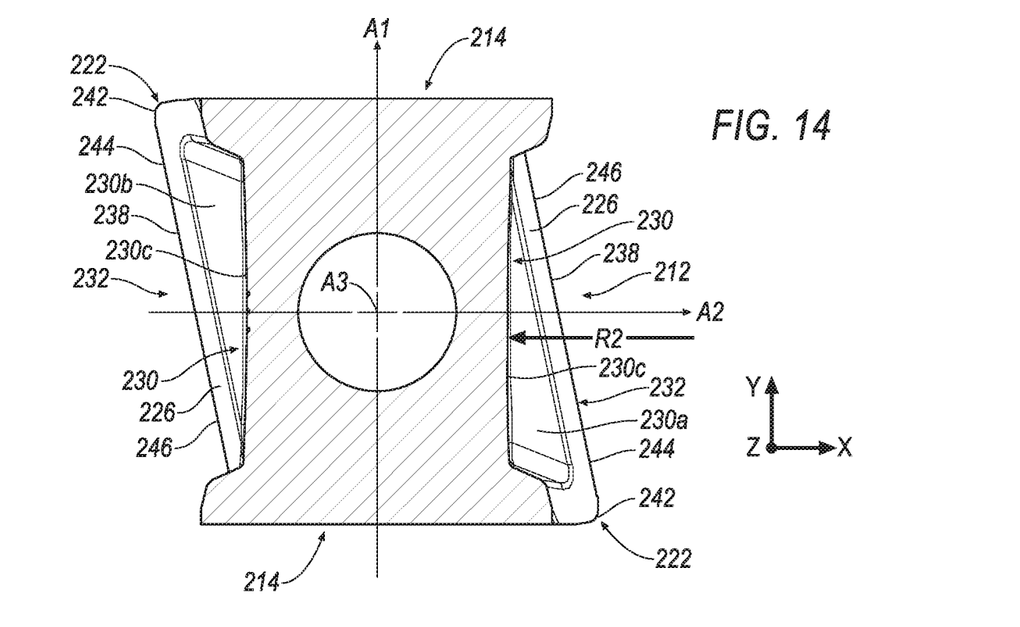
FIG. 14 is a cross-sectional view of the exemplary embodiment of the second type of cutting insert taken along line 14-14 of FIG. 12.

Referring now to FIGS. 13 and 14, each end surface 212 of the cutting insert 200 has a seating surface 230 for contacting the insert pocket 32 of the milling cutter 10 that extends entirely from one lowered corner 220 to the diagonally opposite lowered corner 220 of the cutting insert 200. In the illustrated embodiment, the seating surface 230 is in the form of a U-shaped groove having side support walls 230a, 230b, and a bottom wall 30c formed between the two side support walls 230a, 230b. The two side support walls 230a, 230b extend from the bottom wall 230c to a rake surface 226 extending between the major edge 232 and the side support walls 230a, 230b Another aspect of the invention is that the bottom wall 230c is formed with a very large radius, R2. As a result, bottom wall 230c has a concave topography. In one embodiment, the radius, R2, is in the range between about 3.00 inches (76.2 mm) to about 5.00 inches (127.0 mm). For example, in the illustrated embodiment, the radius, R2, is about 3.937 inches (100.00 mm). However, it will be appreciated that the invention is not limited by the magnitude of the radius, R2, and that the invention can be practiced with any desirable magnitude of the radius, R2, so long as the bottom wall 230c has a concave topography.

Figure 6:
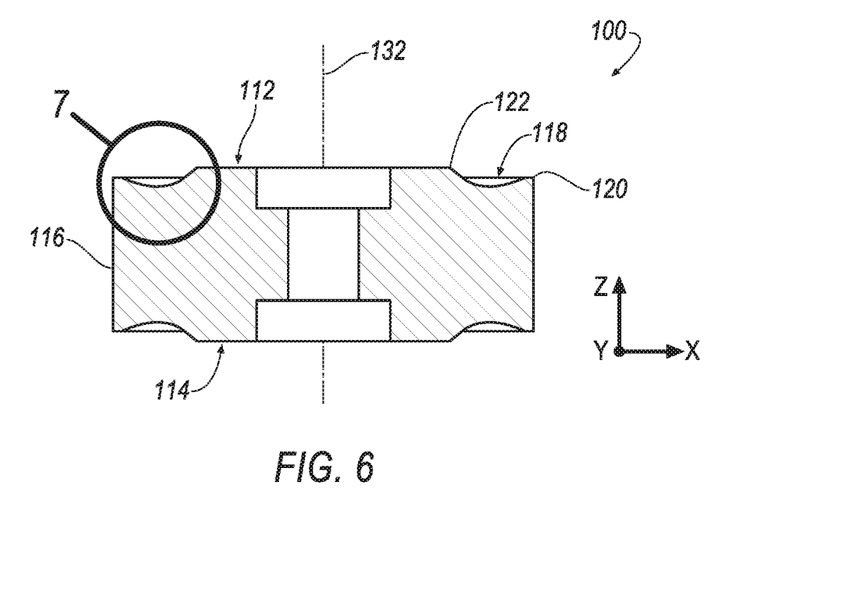
FIG. 6 is a cross-sectional view of the exemplary embodiment of the first type of cutting insert taken along line 6-6 of FIG. 5.

As shown in FIG. 6, the rake surface 226 is formed at a rake angle 248 with respect to the first central axis, A1. The rake angle 248 can be greater than 0 degrees and less than 90 degrees. In the illustrated embodiment, the rake angle 248 is about 65 degrees. However, it will be appreciated that the invention is not limited by the magnitude of the rake angle 248, and that the invention can be practiced with any desirable rake angle.

As shown in FIG. 13, a distance 250 between the bottom wall 230c and the third central axis, A3, remains constant across the entire length of the seating surface 230. In other words, the bottom wall 230c of the seating surface 230 is substantially coplanar along its entire length from one lowered corner 220 to the diagonally opposite lowered corner 220.

As shown in FIG. 12, the bottom wall 230c has a substantially constant width 251 along its entire length from one lowered corner 220 to the diagonally opposite lowered corner 220. On the other hand, the side support walls 230a, 230b have a continuously varying width 252 along their entire length from one lowered corner 220 to the diagonally opposite lowered corner 220. Specifically, the width 252 of the side support walls 230a, 230b are inversely proportional to each other. For example, the width of the side support wall 230a is a minimum, while the width 252 of the side support wall 230b is a maximum at the lowered corner 220, and the width 252 of the side support wall 230a is a maximum, while the width 252 of the side support wall 230b is a minimum at the diagonally opposite lowered corner 220. It is noted that the width 252 of each side support wall 230a, 230b is approximately equal to each other where the first central axis, A1, and the third central axis, A3, intersect each other, as shown in FIG. 12.

As described above, the rotary cutting tool of the invention includes a cutting head having a plurality of insert-receiving pockets for radially mounting a first type of cutting insert in a first cutting region and for tangentially mounting a second type of cutting insert in a second cutting region. The first cutting region has a first length, L1, and the second cutting region has a second length, L2, that is greater in magnitude than the first length, L1. The two types of cutting inserts provides a hybrid cutting insert design in which the first type of cutting inserts provide an increased chip gash volume for effective chip evacuation, and the second type of cutting inserts provide an increased core diameter to minimize deflection of the rotary cutting tool.

Finite element analysis (FEA) demonstrated that the hybrid cutting insert design of the invention reduces deflection by about 30% as compared to an identical rotary cutting tool without the hybrid cutting insert design.

The patents and publications referred to herein are hereby incorporated by reference.

Having described presently preferred embodiments the invention may be otherwise embodied within the scope of the appended claims.

What is claimed is:

1. A rotary cutting tool, comprising:
a cutting head having a plurality of insert-receiving pockets in a first cutting region extending from an end face of the rotary cutting tool, and a second cutting region extending from the first cutting region to proximate a shank of the rotary cutting tool;
a plurality of a first type of cutting inserts radially mounted in the insert-receiving pockets of the first cutting region of the cutting head, each first type of cutting insert having a first length, LX1; and
a plurality of a second type of cutting inserts tangentially mounted in the insert-receiving pockets of the second cutting region of the cutting head, each second type of cutting insert having a second length, LZ2,
wherein the second length, LZ2, is less than the first length, LX1,
wherein the plurality of the first type of cutting inserts provide an increased chip gash volume for effective chip evacuation,
wherein the plurality of the second type of cutting inserts provide an increased core diameter to minimize deflection of the rotary cutting tool,
wherein the rotary cutting tool has a length to diameter ratio above about 2:1.

2. The rotary cutting tool of claim 1, wherein the first cutting region has a first length, L1, and the second cutting region has a second length, L2, and wherein the first length, L1 of the first cutting region is greater than 50% of a total length (L1+L2) of the first cutting region and the second cutting region.

3. The rotary cutting tool of claim 1, wherein the first type of cutting insert comprises a first surface, a second surface and at least one flank surface extending between the first surface and the second surface, the first surface including a chip forming feature extending in a radially outwardly direction to a cutting edge and extending in a radially inwardly direction to an inner edge, the chip forming feature including a front wall that slopes downward from the cutting edge radially inward toward a rounded bottom surface, and a back wall that slopes upward from the rounded bottom surface radially inward to the inner edge.

4. The rotary cutting tool of claim 3, wherein the front wall slopes downward at a rake angle of between about ten degrees and about twenty-five degrees with respect to a plane that is substantially perpendicular to a central, longitudinal axis of the first type of cutting insert.

5. The rotary cutting tool of claim 3, wherein the rounded bottom surface is formed with a radius, R, of between about 0.02 inches (0.508 mm) to about 0.08 inches (2.032 mm) and a depth of between about 0.006 inches (0.1524 mm) to about 0.025 inches (0.635 mm) with respect to the cutting edge of the first type of cutting insert.

6. The rotary cutting tool of claim 3, wherein the back wall slopes upward at an angle of between about thirty degrees and about fifty degrees with respect to a plane that is substantially perpendicular to a central, longitudinal axis of the first type of cutting insert.

7. The rotary cutting tool of claim 3, wherein the inner edge is formed at an intersection between the back wall and a central plateau that acts as a seating surface for the first type of cutting insert.

8. The rotary cutting tool of claim 3, wherein the first type of cutting insert is polygonal in shape.

9. A rotary cutting tool, comprising:
a cutting head having a plurality of insert-receiving pockets in a first cutting region proximate an end face of the rotary cutting tool and a second cutting region proximate a shank of the rotary cutting tool;
a plurality of a first type of cutting inserts mounted in the insert-receiving pockets of the first cutting region of the cutting head; and
a plurality of a second type of cutting inserts mounted in the insert-receiving pockets of the second cutting region of the cutting head,
wherein the plurality of the first type of cutting inserts provide an increased chip gash volume for effective chip evacuation, and
wherein the plurality of the second type of cutting inserts provide an increased core diameter to minimize deflection of the rotary cutting tool,
wherein the second type of cutting insert comprises:
two opposing end surfaces, two opposing minor side surfaces extending between the two opposing end surfaces, two opposing major side surfaces extending between the end surfaces and the minor side surfaces, each end surface having four corners comprising two lowered corners and two raised corners, the two lowered corners being diagonally opposite each other, the two raised corners being diagonally opposite each other;
two opposing major edges formed at an intersection of each end surface and the major side surfaces, two opposing minor edges formed at an intersection of each end surface and the minor side surfaces, and two opposing corner edges formed at an intersection of each the corner side surfaces and the major side surfaces; and
a major cutting edge formed at an intersection of each major edge and the end surface, and a minor cutting edge formed at an intersection of each minor edge and the end surface, and a corner cutting edge formed at an intersection of the major and minor cutting edges,
wherein each end surface includes a seating surface that extends from one lowered corner to the diagonally opposite lowered corner,
wherein the seating surface is in the form of a U-shaped groove having a first side support wall, a second side support wall and a bottom wall therebetween, and
wherein the bottom wall is formed with a radius, R2, such that the bottom wall has a concave topography.

10. The rotary cutting tool of claim 9, wherein each minor side surface is formed with a radius, R1, such that each minor side surface has a convex topography.

11. The rotary cutting tool of claim 9, further comprising a rake surface extending between the first and second side support walls and the major edge, wherein the rake surface is formed at an angle with respect to a central axis, A2, passing through the minor side surfaces of the second type of cutting insert.

12. The rotary cutting tool of claim 9, wherein the first and second side support walls have a continuously varying width.

13. The rotary cutting tool of claim 9, wherein the bottom wall has a constant width.

14. The rotary cutting tool of claim 9, wherein each minor side surface has 180° rotational symmetry about a central axis, A2, passing through the two minor side surfaces.

15. The rotary cutting tool of claim 9, wherein each major side surface has 180° rotational symmetry about a central axis, A3, passing through the two major side surfaces of the cutting insert, and wherein a central axis, A2, is perpendicular to a central axis, A1, passing through the two end surfaces, and the central axis, A3, is perpendicular to the central axis, A1, and to the central axis, A2.

16. The rotary cutting tool of claim 9, wherein the cutting insert further includes four opposed corner side surfaces between the minor and major side surfaces and the end surfaces.

17. The rotary cutting tool of claim 9, wherein a section of the major cutting edge proximate the raised corner constitutes a leading end of the major cutting edge, and wherein a section of the major cutting edge proximate the lowered corner constitutes a trailing end of the major cutting edge.

18. The rotary cutting tool of claim 9, wherein the rotary cutting tool has a length to diameter ratio above about 2:1.

19. A rotary cutting tool, comprising:
a cutting head having a plurality of insert-receiving pockets in a first cutting region proximate an end face of the rotary cutting tool and a second cutting region proximate a shank of the rotary cutting tool, the first cutting region having a first length, L1, and the second cutting region having a second length, L2;
a plurality of a first type of cutting inserts radially mounted in the insert-receiving pockets of the first cutting region of the cutting head; and
a plurality of a second type of cutting inserts tangentially mounted in the insert-receiving pockets of the second cutting region of the cutting head,
wherein the first length, L1 of the first cutting region is greater than 50% of a total length (L1+L2) of the first cutting region and the second cutting region.

* * * * *